United States Patent [19]

Fischer

[11] Patent Number: 5,191,286
[45] Date of Patent: Mar. 2, 1993

[54] METHOD AND PROBE FOR NON-DESTRUCTIVE MEASUREMENT OF THE THICKNESS OF THIN LAYERS AND COATINGS

[76] Inventor: Helmut Fischer, Industriestr, 21, 7032 Sindelfingen 6, Fed. Rep. of Germany

[21] Appl. No.: 720,885

[22] Filed: Jun. 25, 1991

[51] Int. Cl.⁵ ............................................. G01R 33/12
[52] U.S. Cl. ..................................... 324/230; 324/232
[58] Field of Search ................................ 324/229–231, 324/225, 232

[56] References Cited
U.S. PATENT DOCUMENTS 3,986,105  10/1976  Nix et al. ............................... 324/230
4,752,739   6/1988  Wang ..................................... 324/230

Primary Examiner—Walter E. Snow

[57] ABSTRACT

Non-destructive methods of measurement for determining the thickness of thin layers, using the magneto-inductive method or the eddy-current method yield measured values which depend not only on the actual layer thickness present, but also on the shape of the measured object. It is the object of the invention to specify in a simple way, and without it being necessary for an operator to change his way of thinking, a device and a method in accordance with which the layer thickness indicated is virtually independent of the shape of the measured object. With regard to the device, this is achieved according to the invention when the probe has at least two different coil devices and, with regard to the method, when a corrected layer thickness is calculated from the different measured values of the two coil devices.

22 Claims, 6 Drawing Sheets

| t /μm | t₁ /μm | z(xₙ) | t corr/μm | t corr − t /μm |
|---|---|---|---|---|
| 25.1 | 7.93 | 13.1 | 26.4 | 1.3 |
| 48.9 | 103.2 | 13.0 | 49.5 | 0.6 |
| 99.5 | 155.7 | 12.9 | 100.4 | 0.9 |
| 221.0 | 281.5 | 12.4 | 221.7 | 0.7 |
| 505.0 | 579.8 | 10.9 | 505.0 | 0.0 |
| 979.0 | 1083.0 | 8.0 | 958.0 | −21.00 |

FIG. 5

| /μm | t₁ /μm | z(xₙ) | t corr/μm | t corr − t /μm |
|---|---|---|---|---|
| 8 | 103.2 | 13.1 | 49.5 | 0.6 |
| 12 | 85.3 | 13.1 | 47.8 | −1.1 |
| 20 | 71.5 | 13.1 | 48.5 | −0.4 |
|  | 49.0 | 13.1 | 49.0 | 0 |

FIG. 6

METHOD AND PROBE FOR NON-DESTRUCTIVE MEASUREMENT OF THE THICKNESS OF THIN LAYERS AND COATINGS

TECHNICAL FIELD

The invention relates to a method for the non-destructive measurement of thin layers and a probe device therefor.

BACKGROUND ART

Relevant prior art is disclosed in German Offenlegungsschriften 3,902,095; 3,437,253; 2,556,340.

Non-destructive methods for layer thickness measurement, which use the widespread magneto-inductive method or the eddy-current method, are based on the variation in a low-frequency or high-frequency electromagnetic field as a function of a layer applied to the measured object. The field used for measurement has a spatial extent, and thus there is not only a desired dependence on the layer thickness, but also on the shape of the measured object.

In the case of the magneto-inductive, low-frequency method, which is used to measure non-magnetic or electrically non-conductive layers on a magnetic base material, the permeability of the measured object also features in the measurement as a further disturbance variable. In the eddy-current method, which is principally used to measure electrically non-conductive or weakly conductive layers on nonferrous metals, the influence of the geometrical shape of the measured object is substantially more strongly pronounced. Instead of the permeability, which with nonferrous metals can be set virtually equal to 1, the electrical conductivity of the base material also features as a further disturbance variable. It has recently become possible to use circuit engineering in order to exclude this undesired influence over a wide range for the latter disturbance variable.

In both methods, the geometrical shape of the measured object remains a non-negligible influencing variable. It is therefore necessary in measurement practice to perform a so-called calibration on the measured object. This is carried out by simulating the measured value 0 firstly on the non-coated measured object and then on a measured object with a known layer, which is applied either permanently or in the form of a foil on the non-coated measured object. The indicated value corresponding to the measured value is set to the known layer thickness of the measured object. This calibration can be carried out using a plurality of layers in order to match the characteristic better to the relevant measurement task. Since the measured object is not generally available in a non-coated form, and often has very complex shapes, it is mostly very difficult to measure layer thicknesses on concave or convex surfaces. One of the possibilities of reducing the geometrical influencing variables resides in the design of the measuring probe. The smaller the measuring probe, the smaller is the spatial extent of the measuring field and thus the dependence on the geometrical shape of the measured object. However, such measures are limited, since for the layer thicknesses in the range 0–300 $\mu$m, which are principally of interest in practice, the probes would have to be kept so small in size that an implementation of such designs is no longer technically possible.

DISCLOSURE OF INVENTION

It is the object of the invention to eliminate, over a wide range, the undesired dependence of the measured value on the geometrical shape of the measured object by means of an arrangement. At the same time, the design of the measuring probe is still to be easy to master in terms of production engineering, and is to have a high sensitivity in the measuring range of approximately 0–500 $\mu$m. According to the invention, this object is achieved, with respect to the method by the following features:

using a probe including an inner core having a geometrical center, at least two coil devices having geometrical centers wound nondisplaceably about said inner core, said geometrical centers of said inner core coinciding with said geometrical centers of said coil devices, output means for said coil devices, and computer means connected to said output means for computing a layer thickness, t, from output values transmitted from said coil devices, transmitting different output values for the same layer measurement from said coil devices, and resolving the output values occurring during measurement from said coil devices for the layer thickness, t, in said computing device.

The object of the invention is achieved with respect to the probe device by the following features:

an inner core having a geometrical center at least two coil devices having geometrical centers wound nondisplaceable about said inner core, said geometrical centers of said inner core coinciding with said geometrical centers of said coil devices, said coil devices being adapted to transmit different output values for the same layer measurement, each coil device having an output line, and computer means connected to said output lines for computing layer thickness, t, by resolution of output values occurring during measurement from said coil devices.

It should be pointed out that in this technique the layer to be measured is not measured against air, but that the layer to be measured is always seated on a carrier material.

Thin layers in this sense are in the range from 0 to a few hundred micrometers, but can also be, for example, up to 15 mm thick, if bitumen or ceramic layers are measured, for example.

If magneto-inductive, that is to say in the language of this technique "low-frequency", measurements are made, two windings, specifically an excitation winding and an induction winding are required, such as the windings 33, 36 from German Offenlegungsschrift 3,437,253, for example. In this regard, the frequency band is approximately between 20 Hz and 1 kHz. If measurements are made using the eddy-current method, only a single coil is required, because the latter is situated in the resonant circuit of an oscillator and varies its frequency depending on the damping. Here, the frequency band used is between 100K Hz and 10 MHz.

If measurements are made at super high frequency, it is possible to use cavity resonators open towards the measured object, which in this frequency band generate a magnetic field analogous to a coil. The frequency band can then be roughly 10 MHz to 10 GHz.

A "coil device" in the meaning of the claims can therefore be a single coil, can be constructed from two or more coils, can be a super high frequency component which generates a magnetic field, or can be produced using multilayer technology or a similar technology.

The method includes the following additional inventive features:

Causing the output values of each of said coil devices to obey the relationship of an equation having two unknowns.

The output values of one of said coil devices obeys the relationship $$t_1 = \Delta_1 + t,$$

$t_1$ being the measured value of said one of said coil devices and $\Delta_1$ a constant and $t$ the actual layer thickness, and the output values of the other of said coil devices obeys the relationship $$t_2 = \Delta_2 + t,$$

$t_2$ being the measured value of said other of said coil devices and $\Delta_2$ a constant.

Setting $\Delta_1 = c$ and $\Delta_2 = c \cdot z \ (x_n)$,
$z$ being a constant and $x_n$ a normalized measured value of said other of said coil devices.

Storing characteristics of measured values for layer thickness for a plane measurement in said computer means.

Storing said characteristics in a form in which the measured values are normalized.

Normalizing the measured values in a range between 0 and 1 (0 and 1000).

Said coil devices have different mean diameters.

The probe device includes the following additional inventive features:

The coil devices are super high frequency devices that generate focussed magnetic fields.

The coil devices are arranged concentrically with the geometrical central axis of the probe.

The coil devices are circular.

The coil devices have bodies that have a constant elongated rectangular cross-section.

In the case of low-frequency magneto-inductive operation, one of the coil devices is seated on a core of high permeability iron.

The iron is silicon/iron.

In the case of high frequency operation using the eddy-current principle, one of the coil devices is seated on a core of ferritic material.

In the case of super high frequency operation, one of the coil devices is seated on a non-conductive material.

In the case of low-frequency operation, a shield is provided between the coil devices, which shield consists of high permeability iron.

In the case of high-frequency operation, the shield is composed of a ferritic material.

In the case of super high frequency operation, the shield is composed of a highly conductive metal.

The coil devices comprise an inner coil device and an outer coil device having a shielding sleeve covering the outer coil device.

BRIEF DESCRIPTION OF THE DRAWINGS

The invention will now be described with reference to two exemplary embodiments. In the drawings:

FIG. 5 shows a first table representing the performance of the invention, and FIG. 6 shows a second table of the same sense.

FIG. 7 shows suitable circuits for exciting, by generators 70, 71, the inner coil 18 and the outer coil 36 and for decoding, through decoders 72, 73 two signals of different frequency, using an eddy-current probe. The output signals pass to a computer 74 that calculates and shows the corrected layer thickness in display 75 according to the computer flow diagram in FIG. 4.

EMBODIMENTS FOR CARRYING OUT THE INVENTION

Figure 1:
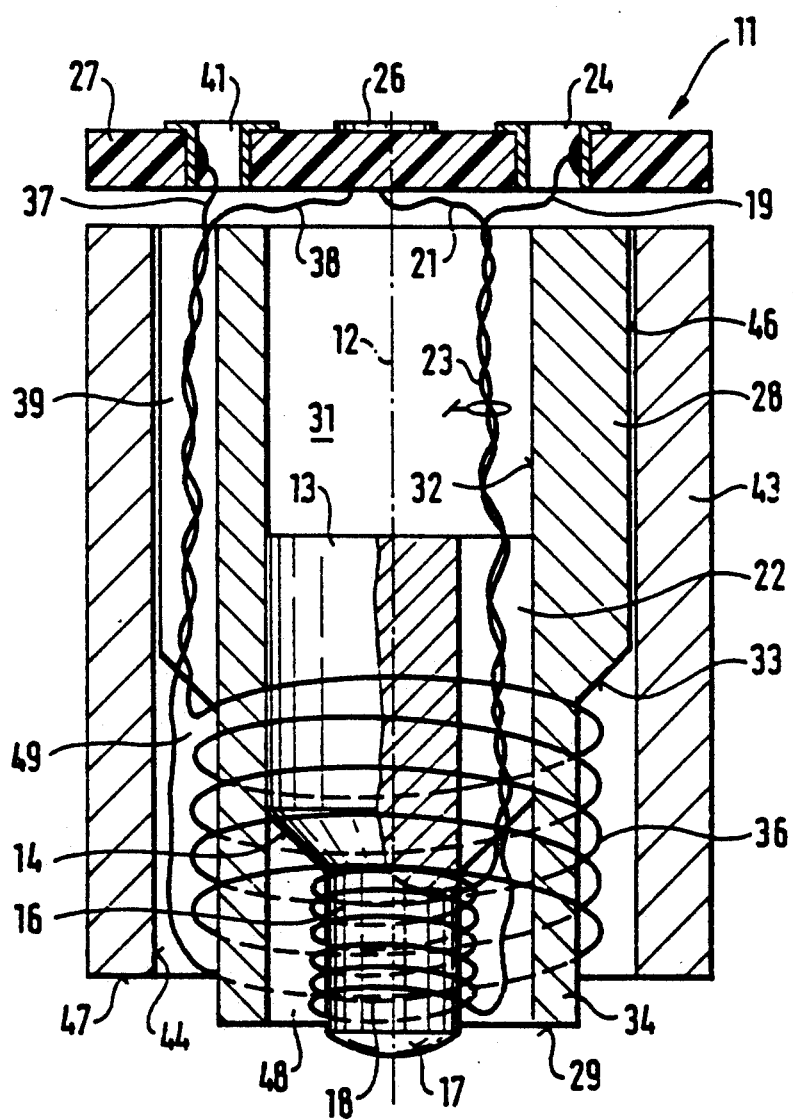
FIG. 1 shows a cross section through the lower part of a probe, which is not otherwise further represented, substantially enlarged but to scale.

A probe 11 serves measurement using the eddy-current principle. It has a geometrical longitudinal axis 12. Provided in relation thereto is a coaxial core 13 of ferrite, which has an outside diameter of 1.4 mm. Other dimensions can be derived from this dimension. In its lower region, the core is reduced by a step 14 to a coil core 16 which has a mounting spherical cap 17 of abrasion-resistant material at the bottom. Seated on the coil core 16 is a coil 18 of copper wire, whose two connecting wires 19, 21 are led upwards and which—in so far as they pass the core 13—extend in a longitudinal groove 22 of the core 13. The connecting wires 19, 21 are shielded by means of a symbolically represented shield 23 and are fastened at the top to contacts 24, 26 of a connection plate 27, which is rigidly mounted in a way not represented on the probe body (not represented).

The center of the magnetic field of the coil 18 and the center of the coil core 16 coincide with the geometrical longitudinal axis 12, which penetrates the surface of the mounting spherical cap 17 exactly at its center.

Seated coaxially with the geometrical longitudinal axis 12 is an outer sleeve 28 of ferrite, whose lower annular end face 29 is perpendicular to the geometrical longitudinal axis 12 and ends just above the mounting spherical cap 17. A cavity 31, in which the connecting wires 19, 21 run in a mechanically and electromagnetically protected fashion, is formed above the core 13. Between the circular cylindrical inner wall 32 and the likewise configured outer wall of the core 13 there is a gap (not representable in the figure), which permits a relative displacement along the geometrical longitudinal axis 12, that is, however, negligible as a magnetic resistance. The outer sleeve 28 has an inwardly directed step 33 approximately halfway up. This results in a circular cylindrical coil tube 34 which is coaxial with the geometrical longitudinal axis 12 and has approximately half the wall thickness. Seated thereon is a coil 36 of thin copper wire, whose magnetic field coincides at its center, during operation, with the geometrical longitudinal axis 12. Connecting wires 37, 38 of the coil 39 are led through a longitudinal groove 39, which is open outwards, to contacts 41, 42 of the connection plate 27.

A shielding sleeve 43 of magnetizable, high permeablity material is coaxial with the geometrical longitudinal axis 12 and is an annular cylinder. A gap between the inner wall 44, the shielding sleeve 43 and the outer wall 46 of the outer sleeve 28 is insignificant from the point of view of the magnetic resistance, but permits a guided relative movement of the shielding sleeve 43 on the outer sleeve 28. The lower end face 47 is perpendicular to the geometrical longitudinal axis 12, and permits the end face 29 and thus also the mounting spherical cap 17 to emerge downwards. The shielding sleeve 43 is sealed at the top with the outer sleeve 28. All the mutually displaceable parts can be connected nondisplaceably to one another, for example by means of a bonding agent, after adjustment.

The design produces, inter alia, two circular cylindrical annular gaps 48, 49, in which the coils 18, 36, which are wound on the whole of the total available heights, are seated.

Figure 2:
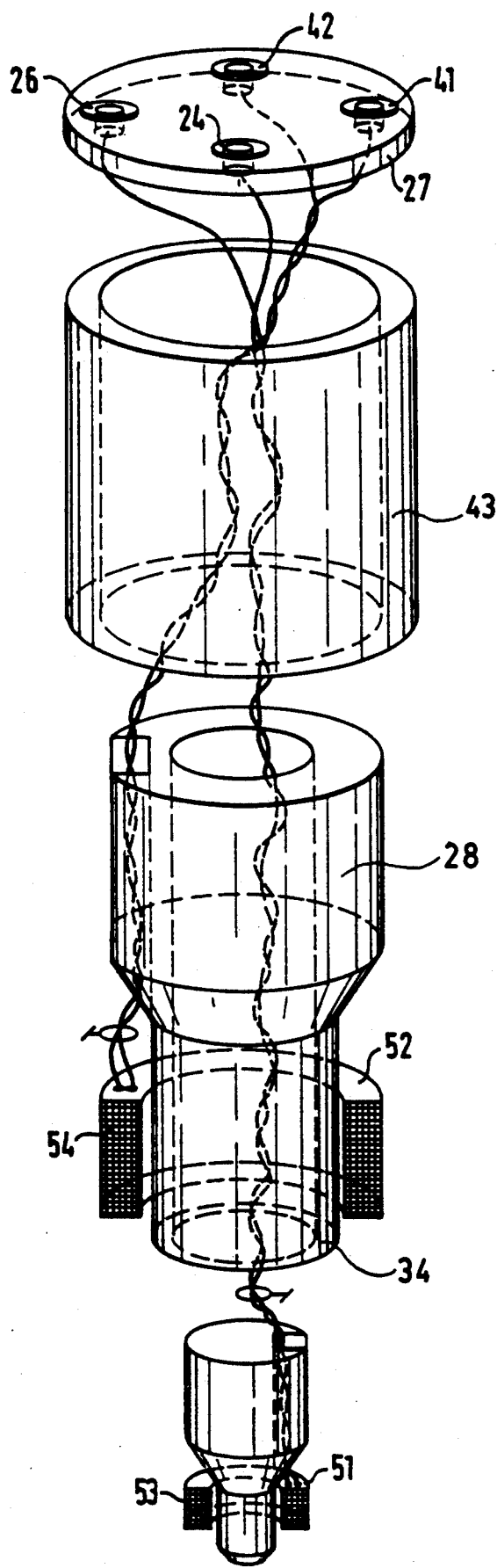
FIG. 2 shows the exploded representation of an entirely similar exemplary embodiment.

The second exemplary embodiment according to FIG. 2 differs from the construction just outlined only in that here the coils 51, 52 have a rectangular cross-section 53, 54. In this case, the cross-section 54 in accordance with FIG. 2 is relatively slimmer than the cross-section 53.

The annular gaps 48, 49 can also be provided per se in one piece in a cup-type core. At present, however, no cup-type cores are known which could be purchased in bulk and would thus be sufficiently cheap and also at the same time have the required dimensional stability and coaxiality with respect to the geometrical longitudinal axis 12.

If the measured object has a deviation from the plane shape with an infinite extent, a so-called geometrical influence is present. The deviation from the said plane shape has a larger influence on the outer coil 36 than on the inner coil 18. A signal is derived from the outer coil 36 which is used to compensate for the geometrical influence on the measured variable.

This is implemented by exciting the coil 18 using another frequency than the outer coil 36. The frequencies have a ratio of 1:2 to 1:10, the inner coil 18 expediently being excited using the higher frequency. There are thus available two signals of different frequency, which can be decoded using suitable circuits. The characteristics, which are required for explanatory purposes, of an eddy-current probe, which is designed for measuring nonconductive or weakly electrically conductive layers on nonferrous metal, are plotted in FIG. 3. The nominated measured variable is obtained by determining electrical reference values on a reference sample having a plane surface which is to be regarded as infinite with respect to the dimensions of the probe and has a conductivity of 10–60 mS/m. These measured values can be present both as voltages and in the form of frequency-encoded signals. When a measuring system is mounted on the plane reference surface, the inner coil 18 obtains the measured value $x_{01}$, which is stored in a memory. In the outer compensation coil, a second measured value $x_{02}$ is stored in a further memory. By lifting the probe from the plane reference surface, a further pair of measured values $x_{s1}$, $x_{s2}$ is obtained, which are stored once again in memories as so-called saturation values, $x_{s1}$ referring analogously to the coil 18, and $x_{s2}$ to the coil 36. The distance from the measured object must be so large that it is no longer possible to perceive any influence due to it. As a rule, this distance is approximately 4 times the diameter of the coil 36. The infinitely large plane reference surface is provided when the latter has approximately 3 times the diameter of the shielding sleeve 43. Thus, four reference values are available, $x_{01}$, $x_{s1}$ for the coil 18 and $x_{02}$, $x_{s2}$ for the coil 36. The signals $x_1$ of the coil 18 and $x_2$ of the coil 36 are thus always between the limit values $x_{01}$ and $x_{s1}$ or $x_{02}$ and $x_{s2}$, and are normalized in a known way as follows:

$$x_{n1} = \frac{x_1 - x_{01}}{x_{s1} - x_{01}} \text{ for coil 18, and } x_{n2} = \frac{x_2 - x_{02}}{x_{s2} - x_{02}} \text{ for the coil 36.}$$

Figure 3:
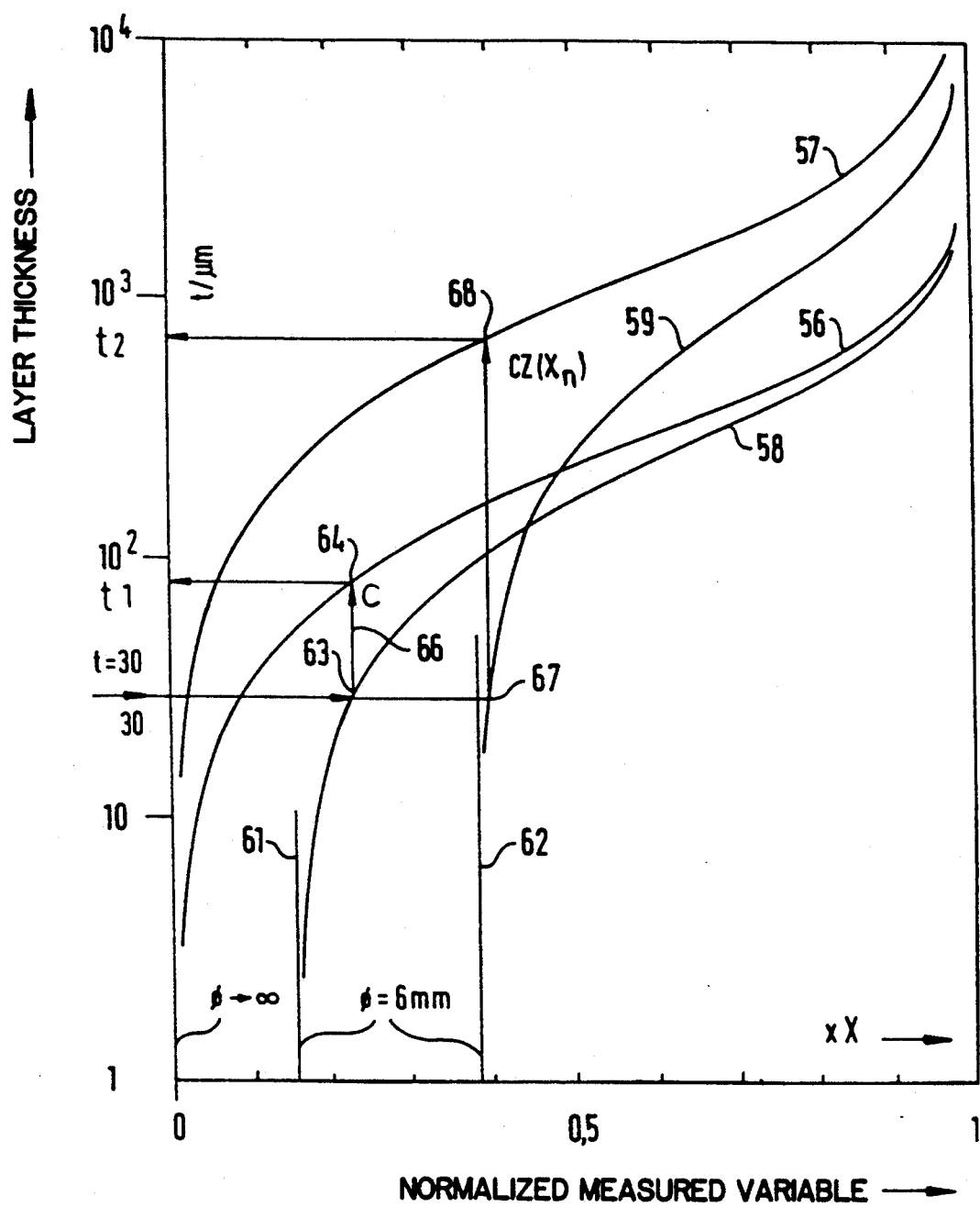
FIG. 3 shows a graph to explain the invention.

The normalized measured variables are represented semi-logarithmically in FIG. 3. The respective normalized measured variable is plotted on the abscissa and the logarithm to the base 10 of the layer thickness is plotted on the ordinate. The characteristic denoted by 56 belongs to the inner coil 18, and the characteristic denoted by 57 belongs to the outer coil 36, after calibration on the infinitely large plane. By definition, the respectively normalized measured value is between 0 and 1 and the two curves 56 and 57 approach the limit values 0 and 1 asymptotically. As may easily be seen, the characteristic 57 referring to the outer coil 36 is situated clearly above the characteristic 56 of the inner coil. If, now, the probe 11 is placed on a concavely curved measured object, the characteristics denoted by 58 and 59 result, to which the asymptotes 61 and 62 for the layer thicknesses 0 refer. The characteristic 58 refers to the coil 18, and 59 to the coil 36. In both coils, the asymptote for an infinitely large layer thickness is the ordinate perpendicular to the abscissa value 1, since in the raised state the coils 18, 36 no longer recognize whether a concavely curved or plane measured object was previously present. If it is now desired to establish the size of the systematic influencing variable for a layer thickness t and concave curvature (in the present case a cylinder of diameter 6 mm), then in the case, for example, of an arbitrarily selected layer thickness of 30 μm, the corresponding ordinate value is plotted of the (sic) in FIG. 3 and cuts the curve 58 at the point 63. The deviation of the plane can be determined by erecting the perpendicular at 63 which cuts the characteristic 56 belonging to the plane measured object at the point 64. Without correction, the measured value $t_1$ corresponding to the point 64 would be indicated. The section 66 is therefore identical to the additional layer thickness simulated by the concave curvature of the measured object (cylinder of diameter 6 mm). The measured value $t_1$ referring at 64 to the inner measuring coil obeys the relationship $$t_1 = t + c,$$

as is easy to see. The same conceptual approach can be adopted with the characteristics 57, 59, which refer to the outer coil 36. The measured value referring to the same layer thickness cuts the characteristic 59 at the point 67, and the measured value $t_2$ read at the point 68 can be determined on the characteristic 57 referring to the plane measured object. As is evident, the influencing variable $$c \cdot z (x_n) \quad (1)$$

determined by the curvature is, as entirely to be expected, substantially larger than in the case of the coil 18. It is therefore possible to write two equations as follows:

$$t_1 = t + c \quad (2a)$$

$$t_2 = t + cz(x_n) \quad (2b)$$

The factor $z(x_n)$ is a virtually constant magnitude to a first approximation, i.e. a constant factor dependent on the diameter ratio of the coils 18, 36. It is now possible to eliminate from the two equations the disturbing, systematic influencing variable, which depends on the geometry of the measured object, and to write the following equation:

$$t_{corr} = t_1 - \frac{t_2 - t_1}{z(x_n) - 1} \quad (3)$$

$t_{corr}$ is written instead of t, since in the mathematical sense $z(x_n)$ is never exactly constant for all the influencing variables.

In this formula, $t_1$ and $t_2$ denote by definition the measured values which refer in the case of the arbitrary layer thickness t to the same convex or concave curvatures and which were derived by the coil 18 and the coil 36. If measurements are made on the plane, $t_1 = t_2$ by definition, and thus the subtrahend in equation (3)=0. In this special case, the measured layer thickness t corresponds to the measured value t of the coil 18. The larger the difference $t_2 - t_1$, the larger becomes the subtrahend by which, as is easy to see, $t_1$ is reduced, because each convex curvature with respect to the plane simulates an additional layer. This variable is not critical, since the numerical factor $z(x)$ has a value of approximately 12 for a ratio of the coil 36 to the coil 18 of approximately 2. Even in the range $0 < X < 0.6$, a fixed numerical value for z permits a 20–100-fold reduction in the systematic influence, for a diameter of a cylindrically curved surface which corresponds approximately to the diameter of the coil 36. For a value twice as large, the compensation is possible in a virtually ideal fashion with a constant numerical factor z.

In order to eliminate an error of second order, z can be calculated as a function of $x_{n1}$ or $x_{n2}$. It is expedient to select $x_{n1}$. Consequently, only the notation $x_n$ will be used below. As already described, this follows from the notation $z(x_n)$. The function $z(x_n)$ can appear as follows, for example:

$$z(x_n) = z_0 (1 - ax_n^p) \quad 2 < p < 5 \; ; \; 0.2 < a < 0.6 \quad (4)$$

Since $z(x_n) > 1$, the following approximation can be written after differentiating equation (3):

$$\Delta t = \frac{t_2 - t_1}{z(x_n)} \cdot \frac{\Delta z(x_n)}{z(x_n)} \quad (5)$$

As stated, the relative change $\Delta z(x_n) / z(x_n)$ is small in dependence on $x_n$ and, as follows from equation (4), thus leads to an error $\Delta t$, which is negligible in practical terms, in the range of x=0 to 0.6, which is of interest for measurement technology. Since the difference $t_2 - t_1$ is reduced both by $z(x_n)$ and by the relative deviation, taking account of equation (4) an outstanding curvature compensation is likewise possible in the less important range of $x_n$ (lacuna) 0.6, since the product of the two quotients determines the residual error of second order, as may be seen from equation (5).

The characteristics shown in FIG. 3 are based on a diameter of the inner coil 18 of approximately 1.5 mm and of the outer coil 36 of approximately 3 mm. Layer thicknesses of up to 1500 μm can easily be measured with curvature compensation using such a probe 11. If the system is enlarged in a linear fashion, the measuring range is also correspondingly larger. However, the extent to which the curvature can be compensated for is correspondingly smaller. Likewise the measuring sensitivity for thin layers.

It is clear from FIGS. 5 and 6, which relate to the characteristics in FIG. 3, that splendid results are obtained using the arrangement described in accordance with the invention. With the present state of digital technology, it is easily possible by making use of microprocessors to process the mathematical algorithm in fractions of a second, so that the formation of the measured value is not encumbered by additional algorithms. The arrangement according to the invention comes very close to the ideal of a curvature-independent measurement after calibration on the plane. Since, in most cases, the measured object is present only in coated form, and calibration is easily possible on a plane reference material for checking purposes, the user provided with a substantial simplification of the method of measurement.

The desired layer thickness, i.e. the actual layer thickness, is given in μm on the left in FIG. 5. If only the coil 18 were to hand, layer thicknesses of 79.3, 103.2 etc μm would be measured. Measured values would be indicated which were larger by the factor 3 . . . 2 than the true measured value, referred to a cylinder of diameter 6 mm. The next column represents the layer thickness of 26.4, 49.5 etc. which can be determined by the invention. The difference between the corrected layer thickness and the desired layer thickness in μm is represented in the column at far right. As is evident, the invention yields a virtually complete compensation for the influence of the curvature. While FIG. 5 shows the case in which a measured object with a constant diameter, that is to say a diameter of 6 mm, is coated with different layer thicknesses, FIG. 6 shows the variants of different diameters in μm with a coating of the same unchanged thickness of 49 μm. Here, too, it is evident that substantial improvement can be achieved by the invention.

Figure 4:
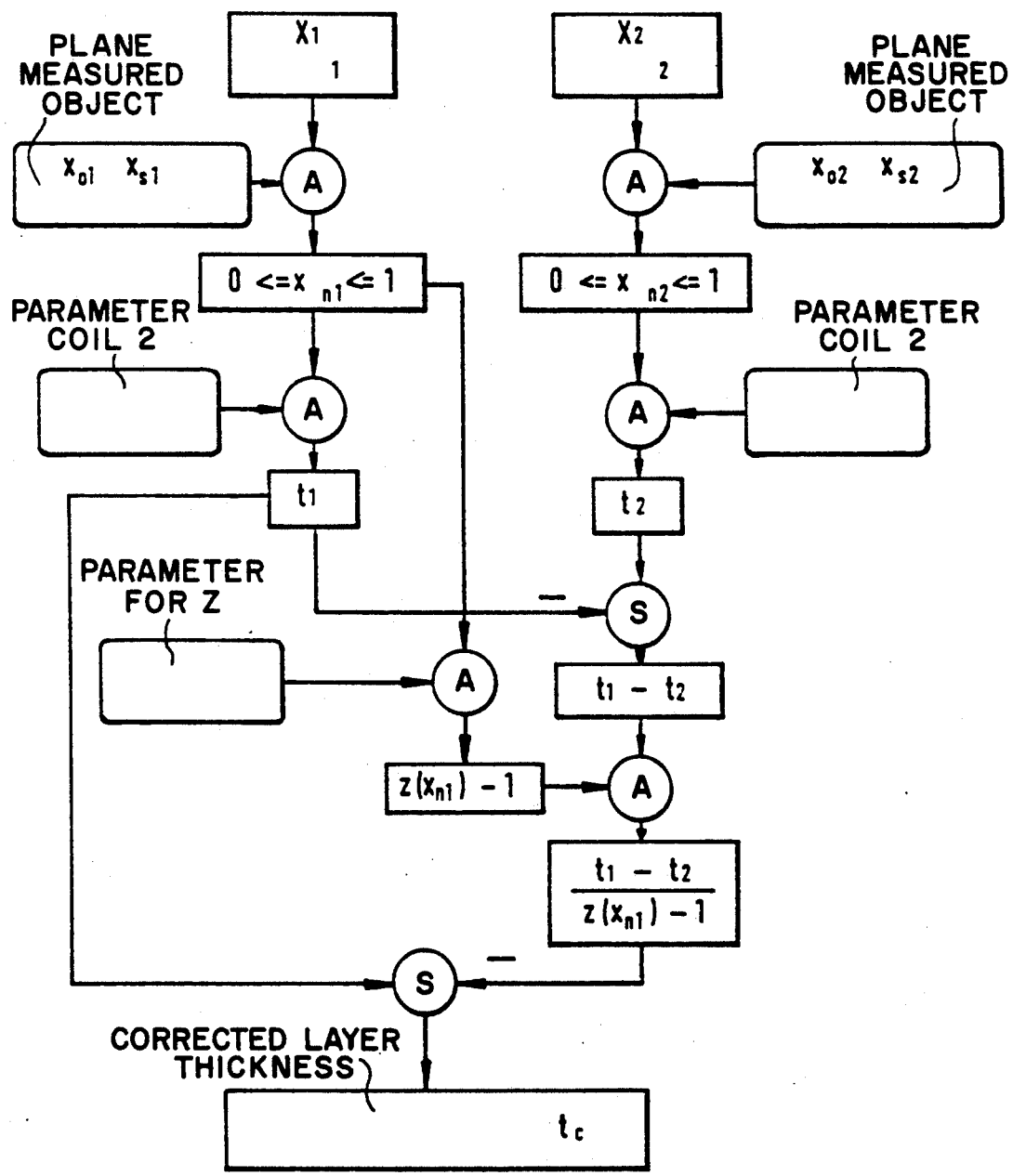
FIG. 4 shows a computing flow diagram for the invention.
Figure 7:
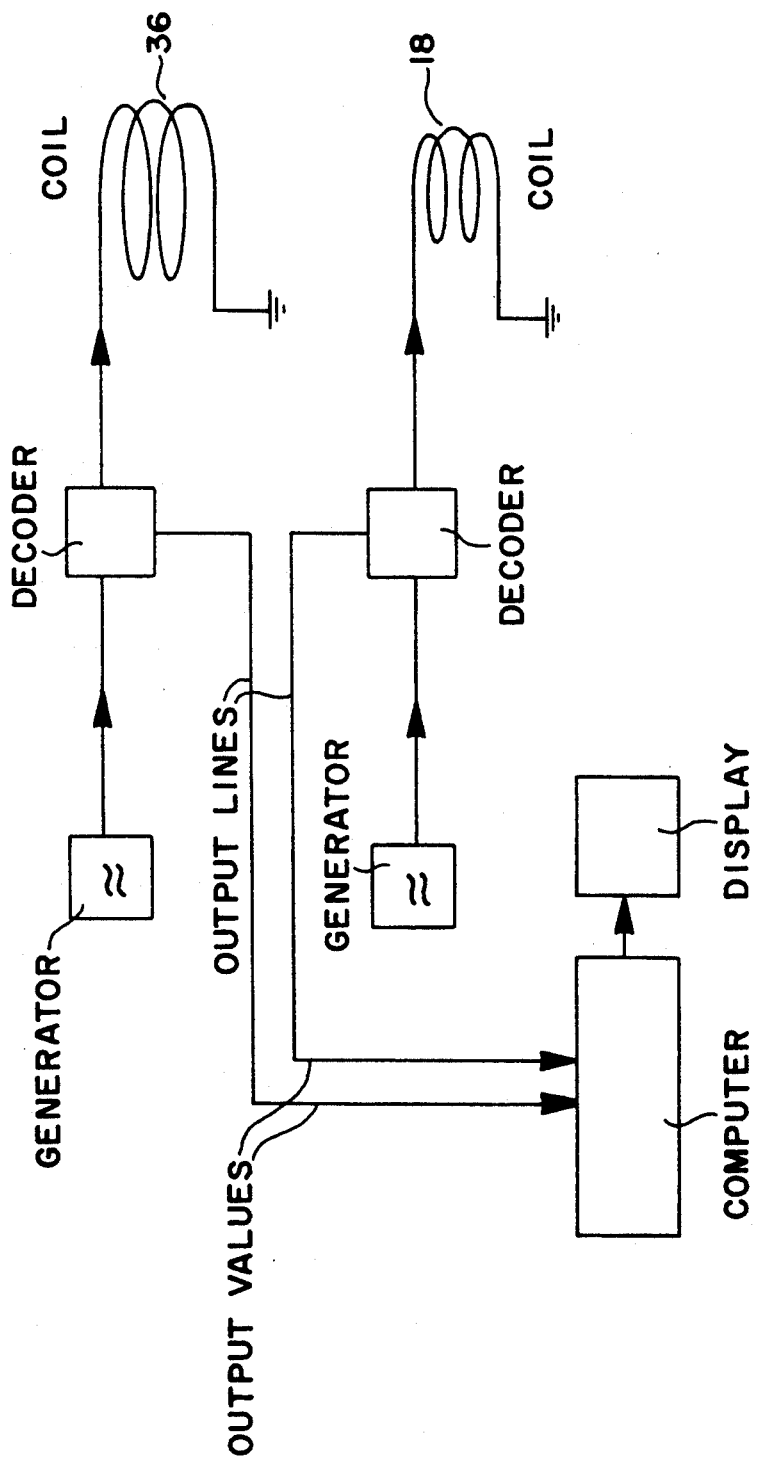
FIG. 7 shows suitable circuits for exciting the coils in the probe, and for decoding and computing output signals from the coils.

FIG. 4 shows a flow diagram for calculating the corrected layer thickness $t_0$ from the measured values $x_1$ and $x_2$ of the coils 18 and 36. The two boxes drawn with round corners signify program memories in which are stored—left—the measured value $x_{01}$ for the plane, uncoated measured object and the measured value for the saturation layer thickness $x_{a1}$, specifically for the coil 18. The same is given on the right for the coil 36. This computational formula is given in the description. $x_{n1}$ and $x_{n2}$ are thus obtained, so that the measured variable can vary only between 0 and 1, as shown in FIG. 3. The normalized measured variable $x_{n1}$ is now combined on the left with the parameters of the coil 1, that is to say the response of the curve 56 is located in this program memory. The combination yields the layer thickness $t_1$, which is also to be found in FIG. 3.

The same takes place analogously on the right, i.e. the response of the curve 58 is stored in the program memory "Parameter Coil 2". The difference $t_1 - t_2$ is then formed on the right. The parameter for z is in a program memory at the same level on the left. This parameter is, after all, largely constant, e.g. equal to the number 12 and has a noticeable deviation only in the upper region of the normalized measured variable. The further combinations can easily be understood with reference to the formulae. As is evident from equation (3), it is still necessary to combine $t_1$ with the quotients written therein, so that the corrected layer thickness $t_o$ is obtained, which is equal to t in equation (3) and is also to be found in FIGS. 5 and 6 in the second column from the right.

The rectangular boxes in FIG. 4 signify measured values or results of computations. Boxes with round corners signify parameters which are stored in the program memory. These parameters have either been preset to fixed values or have been determined at an earlier time by measurement. Circles denote a computational operation, A for addition, S for subtraction.

The slight correction of the computational factor $z(x_n)$ can be performed both as a function of $x_{n1}$ (as illustrated in FIG. 3) and as a function of $x_{n2}$. Since the layer thickness and, in particular, the corrected layer thickness are a function of $x_{n1}$, it is expedient to perform a correction of $z(x_n)$ as a function of $x_{n1}$.

The invention is capable of numerous variations. The computation of the corrected layer thickness $t_{corr}$ need not necessarily be performed via a normalization. Rather, the curves can be plotted without being normalized and then computed later, and this is not a problem with present day computing devices. The advantage with normalization resides in that it is possible to perform a calibration on a plane non-coated measured object that need be checked only at relatively long time intervals.

I claim:

1. Method for the non-destructive measurement of the thickness, t, of thin layers comprising applying to a layer to be measured a probe including an inner core having a geometrical center, at least two active coil devices each generating a different magnetic field for the same layer thickness measurement, having geometrical centers and wound nondisplaceably in relation to said inner core, said geometrical center of said inner core coinciding with said geometrical centers of said coil devices, output means for said coil devices, and computer means connected to said output means for computing said layer thickness, t, from output values transmitted from said coil devices,
    transmitting two different output values corresponding to two said different magnetic fields for the same layer thickness measurement from said coil devices, and
    resolving the output values occurring during the same layer thickness measurement from said coil devices for said layer thickness, t, in said computing device.

2. The method as claimed in claim 1, further comprising causing the output values of each of said coil devices to obey the relationship of an equation having two unknowns.

3. The method as claimed in claim 1, wherein the output values of one of said coil devices obey the relationship $$t_1 = \Delta_1 + t,$$

t being the measured value of said one of said coil devices and $\Delta_1$ a constant and t the actual layer thickness, and the output values of the other of said coil devices obeys the relationship $$t_2 = \Delta_2 + t,$$

t being the measured value of said other of said coil devices and $\Delta_2$ a constant.

4. The method as claimed in claim 3, further comprising setting $$\Delta_1 = c \text{ and } \Delta_2 = c \cdot z(x_n),$$

z being a constant and $x_n$ a normalized measured value of said other of said coil devices.

5. Method as claimed in claim 1, further comprising storing characteristics of measured values for layer thickness for a plane measurement in said computer means before applying said probe to a non-planar layer to be measured.

6. Method as claimed in claim 5, further comprising storing said characteristics in a form in which the measured values are normalized.

7. Method as claimed in claim 6, further comprising normalizing the measured values in a range between 0 and 1.

8. Method as claimed in claim 1, wherein said coil devices have different mean diameters.

9. Probe for the non-destructive measurement of the thickness t, of thin layers comprising
    an inner core having a geometrical center,
        at least two active coil devices each generating a different magnetic field for the same layer thickness measurement and having geometrical centers wound nondisplaceable in relation to said inner core,
        said geometrical centers of said inner core coinciding with said geometrical centers of said coil devices,
        said coil devices being adapted to transmit two different output values corresponding to said different magnetic fields,
        each coil device having an output line, and
        computer means connected to said output lines for computing said layer thickness, t, by resolution of output values occurring during the same layer thickness measurement from said coil devices.

10. Probe as claimed in claim 9, wherein said coil devices comprise wire wound coils.

11. Probe as claimed in claim 9, wherein said coil devices are super high frequency devices that generate focussed magnetic fields.

12. Probe as claimed in claim 9, wherein said coil devices are arranged concentrically with said geometrical central axis of the probe.

13. Probe as claimed in claim 9, wherein said coil devices are circular.

14. Probe as claimed in claim 13, wherein said coil devices have bodies that have a constant elongated rectangular cross-section.

15. Probe as claimed in claim 9, further comprising an outer core, wherein one of said coil devices is seated on said outer core, and one of said cores is composed of high permeability iron.

16. Probe as claimed in claim 15, wherein said iron is silicon/iron.

17. Probe as claimed in claim 9, further comprising an outer core, wherein one of said coil devices is seated on said outer core, and one of said cores is composed of ferritic material.

18. Probe as claimed in claim 9, further comprising an outer core, wherein one of said coil devices is seated on said outer core and one of said cores is composed of non-conductive material.

19. Probe as claimed in one of claims 9 to 16, wherein a shield is provided between said coil devices, which shield consists of high permeability iron.

20. Probe as claimed in one of claims 9 to 14 and 17, wherein a shield is provided between said coil devices, which shield consists of a ferritic material.

21. Probe as claimed in one of claims 9 to 14 and 18, wherein a shield is provided between said coil devices, which shield consists of a highly conductive metal.

22. Probe as claimed in claim 9, wherein said coil devices comprise an inner coil device and an outer coil device having a shielding sleeve covering said outer coil device.

* * * * *